Patented June 8, 1943

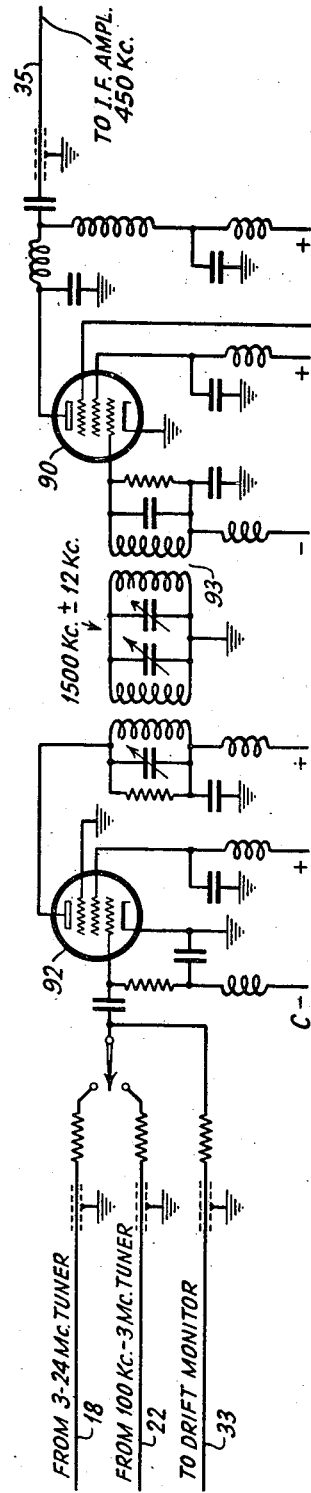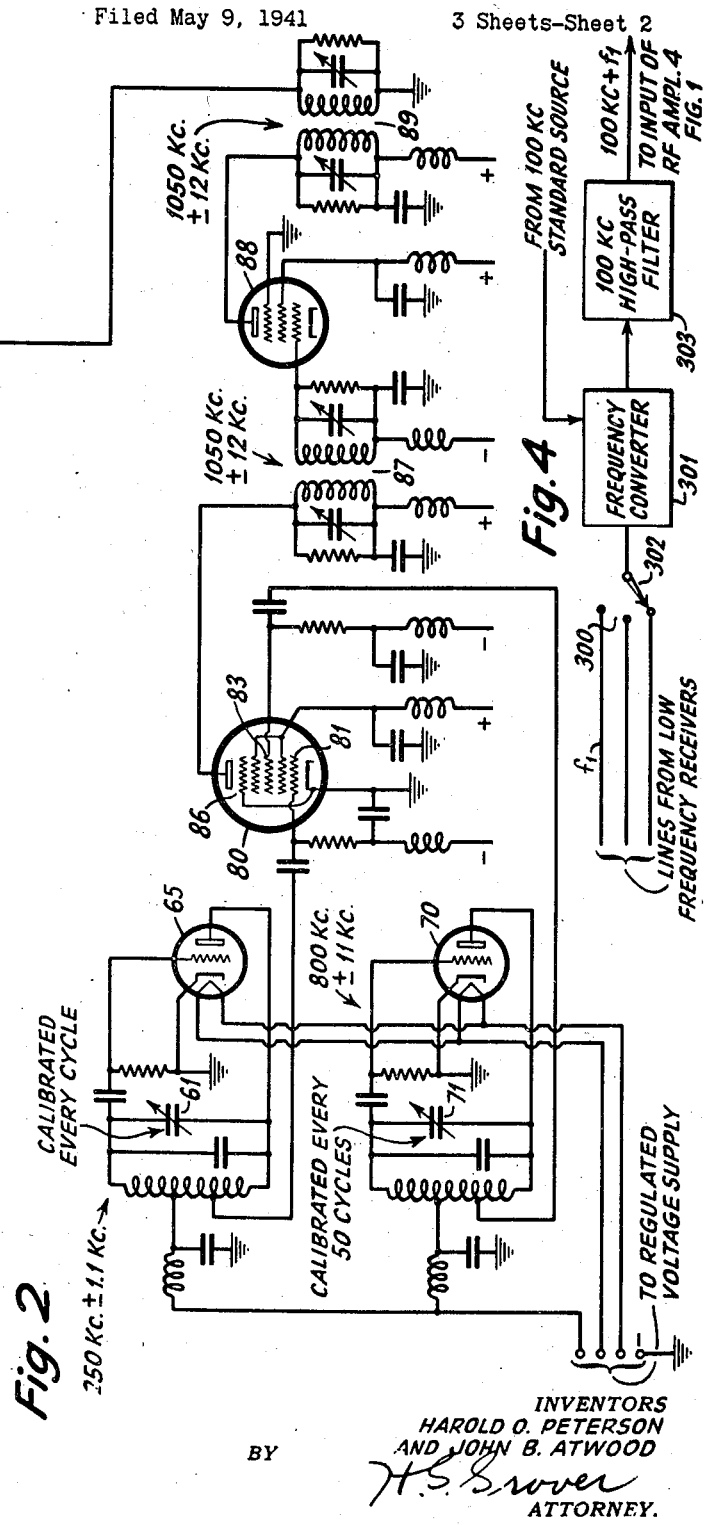

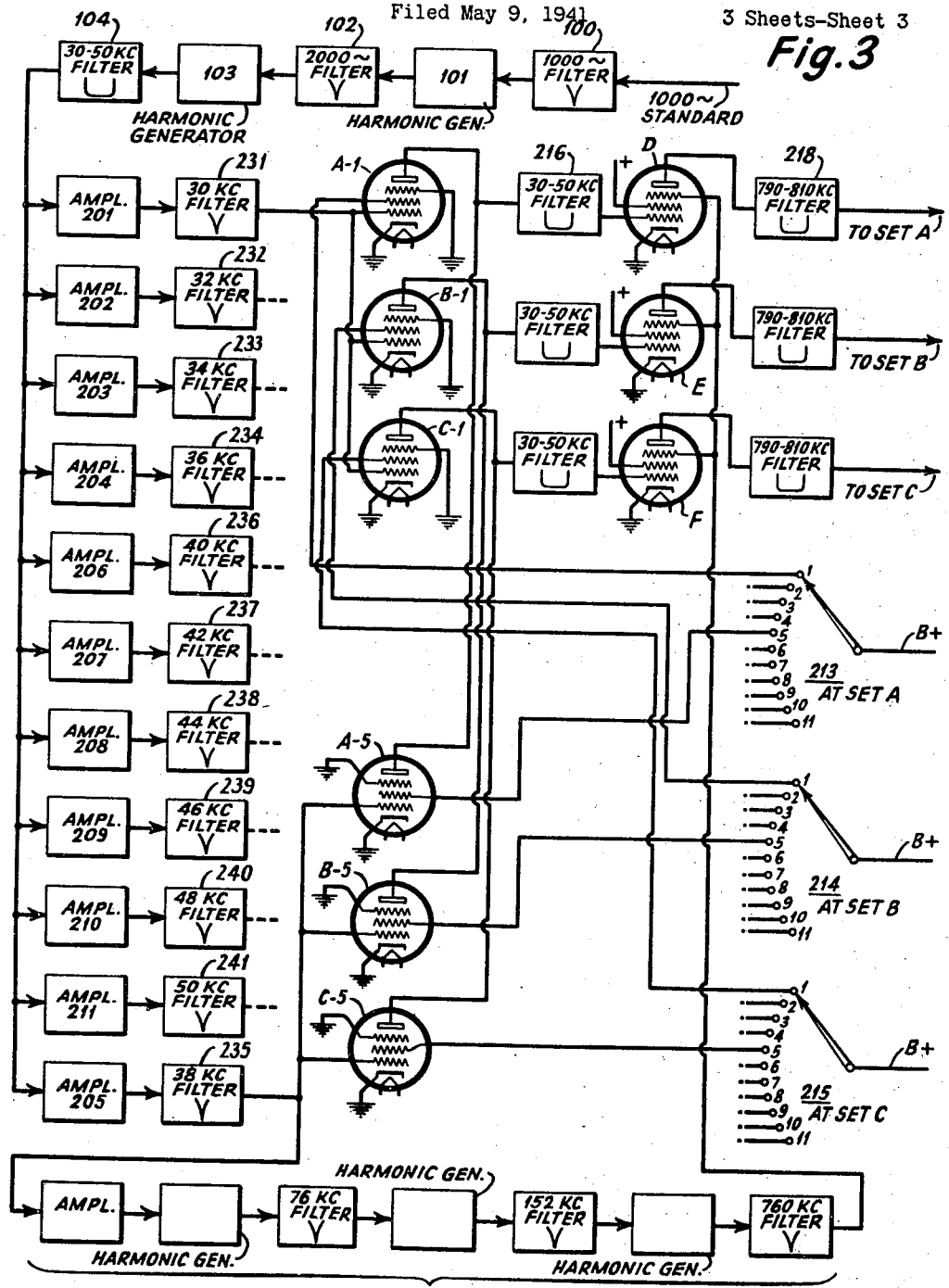

2,321,315

UNITED STATES PATENT OFFICE 2,321,315

FREQUENCY MEASURING SYSTEM

Harold O. Peterson and John B. Atwood, Riverhead, N. Y., assignors to Radio Corporation of America, a corporation of Delaware Application May 9, 1941, Serial No. 392,624

10 Claims. (Cl. 250—39)

The present invention relates to frequency measurement and, more particularly, to a means for measuring radio frequencies.

An object of the present invention is the measurement of radio frequencies.

A further object of the present invention is the accurate measurement of radio frequencies to the nearest whole number of cycles.

Another object of the present invention is the provision of means for measuring the periodicity of radio frequency waves with extreme accuracy.

Still another object of the present invention is the provision of equipment for measuring the periodicity of high frequency waves whereby the measuring equipment may be conveniently and quickly checked as to stability of operation.

The present invention contemplates measurement of the periodicity of a radio frequency wave by receiving the wave, heterodyning therewith the wave generated by the oscillator of a superheterodyne receiver which is coupled to the output of a harmonic generator operating from a 10 kilocycle standard frequency source thus determining the frequency of the wave to the nearest 10 kilocycles. The difference between the frequency of the oscillator when the receiver is tuned to the nearest harmonic and the frequency of the received wave is then compared with the output of an interpolation oscillator having separate independent calibrated controls for varying the frequency over ranges of 2 kilocycles and 20 kilocycles. The controls are varied to obtain zero beat and the calibration of the controls read to determine the periodicity of the received radio frequency wave to the nearest whole cycle.

Means are also provided for comparing the waves generated by the different oscillators with that generated by the standard frequency source so that the effects of oscillator drift may be overcome.

Figure 1:
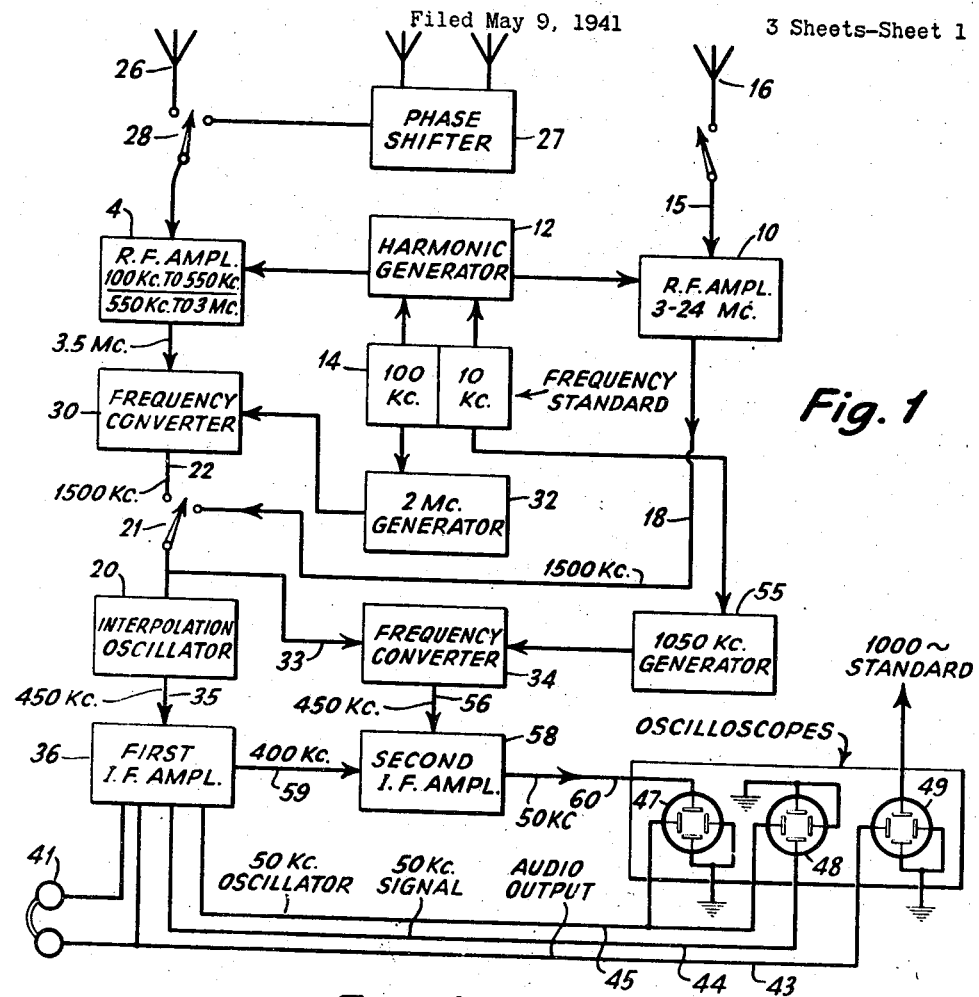
Figure 1A:
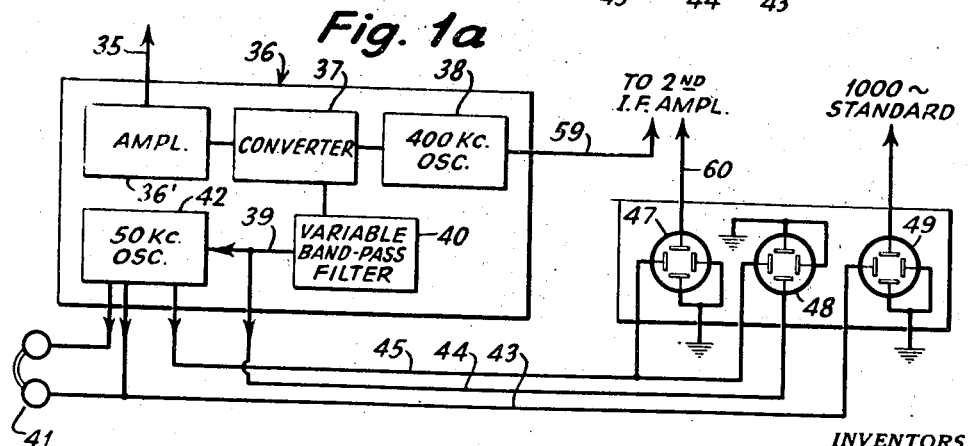

The present invention will be more clearly understood by reference to the following detailed description, which is accompanied by drawings in which Figure 1 illustrates a block diagram of a system for practicing the present invention; Figure 1a illustrates in block diagram form and in greater detail a portion of Figure 1, Figure 2 illustrates in more detail the interpolation oscillator of Figure 1, while Figures 3 and 4 illustrate modifications of the invention.

Referring, now, to the block diagram in Figure 1 at the upper right hand corner there is a radio frequency amplifier 10 covering the frequency range of 3 to 24 megacycles. An input of the amplifier is permanently connected to a harmonic generator 12 operating from the standard crystal oscillator 14 which supplies standard frequencies of ten and one hundred kilocycles. The input 15 of the radio frequency amplifier 10 may be connected to an antenna 16 of appropriate constants for the signal, the frequency of which is to be measured. The output of radio frequency amplifier 10 appears in channel 18 as a wave having a frequency of the order of 1500 kilocycles, and is applied to the interpolation oscillator 20. The input of the interpolation oscillator 20 may be selectively switched by means of switch 21 to two channels, one of which, 18, is the output of the 3 to 24 megacycle radio frequency amplifier 10; the other of which, 22, is the output of a 100 kilocycle to 3 megacycle radio frequency amplifier 4. This last mentioned amplifier, it will be seen, is arranged so that it may be connected directly to an antenna or through phase shifter 27 to two antennas by means of switch 28. Phase shifter 27 is often used when measuring the frequency of a broadcast transmitter (550 kilocycles to 1500 kilocycles). Its purpose is to eliminate interference from a second transmitter on the same channel. For a further description of its operation reference may be had to a copending H. O. Peterson application #236,027, filed October 20, 1938. It is used only in the broadcast band and hence is not shown in connection with radio frequency amplifier 10. The output of amplifier 4 appears as a wave of the order of 3.5 megacycles. In order that this output may be applied to the interpolation oscillator 20 it is converted to a wave of a frequency of the order of 1500 kilocycles by frequency converter 30. This is done by beating the 3.5 megacycle wave from amplifier 4 against a 2 megacycle wave generated in generator 32 from the 100 kilocycle standard source 14. The difference frequency of the order of 1500 kilocycles is fed by means of channel 22 to the switch 21 on the interpolation oscillator input. It will thus be seen that a wave of any frequency from 100 kilocycles to 24 megacycles may be picked up by an appropriate antenna and applied to the input of the interpolation oscillator.

The interpolation oscillator 20 operates at a frequency variable 12 kilocycles above and below a nominal base frequency of 1050 kilocycles. This frequency variation is calibrated and the calibration is used to measure the frequency of the incoming signal by a method which will be explained hereafter in detail. The input signal to be measured, which now is at a frequency of the order of 1500 kilocycles appearing at the input of the interpolation oscillator unit, also is applied through channel 33 to a frequency converter 34. The purpose of this will also be described in detail hereafter.

The wave generated by the interpolation oscillator 20 having a frequency of 1050±12 kilocycles is heterodyned with the 1500 kilocycle signal appearing at its input to produce a wave having an intermediate frequency of 450 kilocycles, which is applied through channel 35 to a first intermediate frequency amplifier 36.

Wherever, in this application, frequencies of 1500 kilocycles, 50 kilocycles, etc., are referred to as appearing in the various intermediate frequency channels it should be distinctly understood that this is only a nominal value and the actual frequency may vary from this within the passband of the channel involved.

As shown in more detail in Figure 1a, the first intermediate frequency amplifier 36 has included therein, in addition to the amplifier channel 36', a frequency converter 37 and an oscillator 38. The 400 kilocycle wave generated by oscillator 38 is combined in converter 37 with the nominal 450 kilocycle input to amplifier 36' to produce another wave having a base frequency of 50 kilocycles. To the output of converter 37 is connected a channel 39 having therein a variable band-pass filter 40 which may be varied to provide three different degrees of selectivity. The amplifier 36 also contains a monitoring system for listening to the incoming signal with a pair of head phones 41, the signal being brought down to audio frequency for this purpose by beating it against a 50 kilocycle wave from oscillator 42. Three output channels are shown from this portion of the intermediate frequency amplifier 36, these being the audio monitoring channel 43, the 50 kilocycle signal channel 44 and the 50 kilocycle oscillator output channel 45. These three outputs are fed to three oscilloscopes 47, 48 and 49, as shown in both Figures 1, 1a.

Returning, now, to Figure 1, the frequency converter 34, the input of which is in parallel with the interpolation oscillator 20 is intended to be used as a monitor on any drift in the oscillators throughout the system during the period of a frequency measurement. The 1500 kilocycle input to the converter 34 appearing on channel 33 is changed to a 450 kilocycle intermediate frequency by beating it in the converter against a 1050 kilocycle wave produced in generator 55 from the 10 kilocycle standard frequency source 14. The 450 kilocycle output from converter 34 is applied through connection 56 to the input of a second intermediate frequency amplifier 58 wherein it is converted to 50 kilocycles by beating against the 400 kilocycle wave produced by oscillator 38 in the first mentioned intermediate frequency amplifier. The second intermediate frequency amplifier 58 is a simplified version of the first as it has only one band width and contains no oscillators or monitoring equipment. The 50 kilocycle output from the second intermediate amplifier 58 is applied by means of channel 60 to the other pair of plates of the oscilloscope 47 than those fed by the 50 kilocycle oscillator 42 in the first intermediate frequency amplifier 36.

The interpolation oscillator will now be described in more detail by reference to Figure 2 of the drawings. The unit actually consists of two separate oscillators, one oscillator, identified by reference numeral 65, operating within a band ±1.1 kilocycles from 250 kilocycles as a midband frequency and the other, identified by reference character 70, operating at 800 kilocycles and variable 11 kilocycles above and below that value. The output of the two oscillators 65 and 70 is applied to separate grids, for example, grids 81 and 83 of a mixer tube 80 to produce the desired nominal frequency of 1050 kilocycles at the anode 86 of the mixer tube 80. The output wave at a frequency of 1050 kilocycles from mixer tube 80 is filtered in the tuned circuits 87 and 89, forming the input and output circuits of an amplifier 88. The filter circuits are arranged to pass a frequency band of ±12 kilocycles with a midband frequency of 1050 kilocycles. The resultant output wave is combined in another mixer tube 90 with the incoming 1500 kilocycle signal from channels 19 or 22 after being amplified as much as desired or considered necessary, as indicated by amplifier 92. A band-pass filter arrangement 93 is included between amplifier 92 and the mixer 90 to pass on the frequencies of 1500 kilocycles ±12 kilocycles. The output of mixer tube 90 then appears in output channel 35 within the desired 450 kilocycle intermediate frequency wave band.

The 250 kilocycle oscillator 65 is variable in frequency ±1.1 kilocycles and the 800 kilocycle oscillator 70 is variable in frequency ±11 kilocycles from their nominally given midband frequencies. The combination of these two frequencies produces a resultant output of 1050 kilocycles±12.1 kilocycles. The tuning controls 61 and 71 on the two oscillators 65 and 70 are calibrated in frequency, the control for the 250 kilocycle oscillator every cycle and the control for the 800 kilocycle oscillator every 50 cycles. If frequencies are to be measured to the nearest cycle, the 50 cycle calibration points on this oscillator are disregarded and its frequency changed by integral multiples of 1000 cycles, this being set precisely by comparison of the audio output of the receiver with the 1000 cycle standard by means of oscilloscope 49. The cycles are then obtained by what amounts to interpolation between the 1000 cycle points by means of the 250 kilocycle oscillator which is calibrated to cycles. The reason for using two separate oscillators for the purpose will become apparent when the method of measuring is discussed hereafter.

Let us assume, for the purpose of illustration, that a frequency of 3743.651 kilocycles is to be measured. The two tuning controls on the interpolation oscillator, that is, controls 61 and 71, are set to zero at which point the output frequency is 1050 kilocycles. Then using the 3 to 24 megacycle radio frequency amplifier 10, the nearest 10 kilocycle harmonic from the harmonic generator 12 is tuned in. This harmonic is 3740 kilocycles. In order to set this accurately to zero beat the pattern on oscilloscope 48 is observed. This oscilloscope compares the frequency of the 50 kilocycle signal produced in the first intermediate frequency amplifier 36 with the output of the 50 kilocycle oscillator 42 used to produce zero beat for the audio monitor. Zero beat is indicated by a stationary single loop pattern on the screen of oscilloscope 48. The frequency of the oscillator in the radio frequency amplifier 10 will now be 3740+1500=5240 kilocycles. This heterodynes with the signal frequency of 3743.651 kilocycles to produce their difference or a wave of a frequency of 1496.349 kilocycles. This wave appears in channel 19. This, in turn, is combined with the 1050 kilocycle wave generated by the interpolation oscillator 20 to produce an intermediate frequency of 446.349 kilocycles which, beating with the 400 kilocycle wave generated by oscillator 38, produces a wave of a frequency of 46.349 kilocycles. Finally, beating this with the 50 kilocycle oscillator 42 produces a 3.651 kilocycle tone in the audio output.

Now, if the frequency of the 1050 kilocycle interpolation oscillator 20 is varied to 1046.349 kilocycles it will beat with the 1496.349 kilocycle signal coming from the radio frequency tuner 10 to produce a 450 kilocycle intermediate frequency which will produce zero beat in the phones 41. The zero beat will also be observed as a single loop pattern on oscilloscope 48.

The amount the interpolation oscillator frequency has been changed is exactly the same as the difference between the signal being measured and the nearest standard harmonic frequency from generator 12. Hence, if the tuning controls of the interpolation oscillator 20 are calibrated directly in cycles frequency change, the readings may be added or subtracted, as the case may be, from the standard harmonic frequency from generator 12 to give the signal frequency directly. The frequency change of interpolation oscillator 20 must be great enough to overlap the intervals between the standard 10 kilocycle harmonics and this indicates that the frequency must be variable by at least ±10 kilocycles. 11 kilocycles has been selected as a reasonable overlap.

It is also necessary for the accuracy desired that the frequency change of the interpolation oscillator be readable to the nearest single whole cycle. If this were to be done with a single calibrated control dial it would require 22,000 divisions, an impractical number. However, if the frequency change is divided between two controls the first reading 1000 cycle points only and the second reading individual cycles between the 1000 cycle points only 1,000 divisions are required.

It is necessary to use separate oscillators for the two tuning controls of the interpolation oscillator since the frequency change produced by either one must be independent of the other if they are to be calibrated directly in terms of frequency change. If the two controls drove parallel variable tuning means in a single oscillator the frequency change produced by the second condenser would depend upon the setting of the first and neither could be directly calibrated in frequency.

Some means must be provided to set the 1000 cycle points on the first mentioned tuning control accurately and we have arranged this to be accomplished by means of oscilloscope 49.

It has been heretofore shown how the 3740 kilocycle harmonic was set to zero beat by means of oscilloscope 48 with the controls of interpolation oscillator 20 set at zero. If the control calibrated in 1000 cycle points is now changed by 3000 cycles, a 3000 cycle tone will be heard. If this is compared with the 1000 cycles from the frequency standard by using oscilloscope 49, the correct point will be indicated by the appropriate stationary Lissajous pattern produced. Leaving the first tuning control set and changing the units calibrated control by 651 cycles the signal will be at zero beat and this is indicated by the pattern on oscilloscope 48. The frequency is then the sum of the standard harmonic frequency and the readings of the two calibrated tuning controls of the interpolation oscillator.

Since there is a possibility of any or all of the oscillators in the system drifting during the period of the measurement, it is desirable to provide a continuous monitor on the frequency stability. This we have accomplished by providing a parallel set of equipment fed from the input of the interpolation oscillator 20 by means of channel 33. The signal in this channel is applied to a frequency converter 34 whose 1050 kilocycle oscillator input is obtained from generator 55 controlled by the frequency standard 14.

As previously described, the 450 kilocycle output of the converter 34 is combined with the 400 kilocycle wave from the oscillator 38 of the first intermediate frequency amplifier to produce a 50 kilocycle wave which is applied to one set of deflecting plates of the oscilloscope 47 by means of channel 60. Likewise, the 50 kilocycle signal from the first intermediate frequency amplifier is applied to the other set of deflecting plates of the oscilloscope 47.

When the radio frequency amplifier 10 is tuned to zero beat with a standard harmonic frequency it produces a fixed pattern on oscilloscope 47, as well as on 48. During the measuring of the signal only the interpolation oscillator 20 is varied. Since the stability monitoring system is connected ahead of interpolation oscillator 20, variations of this oscillator do not affect the monitor circuit. As a result, the drift of all the oscillators in the receiver, except the interpolation oscillator, will be continuously monitored, the drift being indicated by a moving pattern on oscilloscope 47. Any drift may be automatically corrected by changing the tuning of the amplifier 10 irrespective of the frequency of the interpolation oscillator 20. The interpolation oscillator 20 may be checked for drift by resetting the units calibrated tuning control to zero and noting whether or not a stationary pattern is produced on oscilloscope 48 when the tuning control 71 calibrated in 50 cycle units is set at zero, or on oscilloscope 49 if control 71 is set at any whole number of kilocycles other than zero. If desired, automatic gain control may be used in the first intermediary frequency amplifier 36 to help maintain a constant pattern size on oscilloscopes 47 and 48 with changes in the incoming signal level, but automatic gain control is not considered desirable on the second intermediate frequency amplifier 58 as it operates from the constant output of the harmonic generator 12.

The operation of our invention and the indications on the three oscilloscopes 47, 48 and 49 may be briefly summarized, without considering the variations in frequencies in the various channels, in the following manner.

The two control dials on the interpolation oscillator 20 are set to zero and a 10 kilocycle harmonic from harmonic generator 12 is received by radio frequency amplifier 10. By means of suitable tuning controls on amplifier 10, this harmonic is brought to zero beat. At this point oscilloscopes 47 and 48 indicate the zero beat by a stationary circular pattern and oscilloscope 49 will show only a straight line due to the 1000 cycles from the standard 14.

Now as long as the 10 kilocycle harmonic is present in the radio frequency amplifier input and the radio frequency amplifier tuning controls are not changed, oscilloscope 47 continues to show this circular pattern if there is no drift in the various oscillators.

If the 1000 cycle control dial of the interpolation oscillator is now varied, complex patterns appear on both oscilloscopes 48 and 49 until this has changed the received beat frequency by 1000 cycles or a multiple thereof. At this point, oscilloscope 48 continues to show a complex pattern and oscilloscope 49, by an appropriate pattern, indicates the number of thousand cycles the interpolation oscillator dial has been moved. If the cycle dial of the interpolation oscillator is then changed, oscilloscopes 48 and 49 show complex patterns.

If a signal is introduced into radio frequency amplifier 10 by means of antenna 16 and if it is assumed that the above described manipulation of the interpolation oscillator is such as to zero beat the signal, this is indicated by a stationary circular pattern on oscilloscope 48. Oscilloscope 47 continues to show a circular pattern showing no drift in the equipment and oscilloscope 49 indicates a complex pattern.

From the above, it will be seen that the only times oscilloscope 48 indicates zero beat are: (A) when both controls of the interpolation oscillator 20 are at zero and a harmonic is at zero beat, or (B) when the interpolation oscillator controls are such as to produce a zero beat with a received signal.

The accuracy of measurement may be increased and the method of measurement of frequencies simplified at the cost of some increased complexity of structure by using a modified form of interpolation oscillator as hereinafter described.

In the invention, as heretofore described, the interpolation oscillator consists of two oscillators, one operating at 250 kilocycles±1.1 kilocycles and the other at 800 kilocycles±11 kilocycles. On referring to the foregoing description, it may be seen how it is desirable to change the frequency of the 800 kilocycle oscillator in 1000 cycle steps and how this is accomplished by comparing the audio beat from the receiver against the standard 1000 cycles by means of oscilloscope 49 in Figure 1.

In order to overcome the possibility of frequency drift of the 800 kilocycle oscillator 70 and the operating inconvenience of carefully setting the frequency of this oscillator and the time wasted in so doing an interpolation oscillator as shown in Figure 3 may be used whereby the 800 kilocycle frequencies are derived from the 1000 cycle frequency standard and are changed by a control switch at the operating position. This also allows the elimination of oscilloscope 49.

Since the 250 kilocycle oscillator has the frequency range of 2.2 kilocycles, the frequency of the 800 kilocycle supply is changed in 2 kilocycle steps over the range 790 to 810 kilocycles, thus retaining a suitable overlap of the standard 10 kilocycle harmonics from harmonic generator 12.

The manner in which the 790–810 kilocycle frequencies are obtained and controlled may best be seen by referring to Figure 3.

Starting in the upper right hand corner of the diagram, the 1000 cycle standard is filtered by sharp pass filter 100 and fed to a harmonic generator 101 which supplies a 2000 cycle wave. This 2000 cycle wave is filtered at filter 102 and fed to a second harmonic generator 103 which has harmonics every 2 kilocycles. The harmonics from 30 to 50 kilocycles are selected by a bandpass filter 104 and fed to eleven amplifiers 201–211 whose inputs are in parallel. Each amplifier has a filter in its output which selects one of the 2 kilocycle harmonics from 30 to 50 kilocycles. For example, amplifier 201 is followed by filter 231 which passes 30 kilocycles. Similar filters in the other amplifiers are identified by reference numerals 232 to 241. If these frequencies are successively combined with a fixed frequency of 760 kilocycles, a series of output frequencies varying in 2 kilocycle steps over the range 790 to 810 kilocycles will be obtained. In each of the conventional boxes indicating filters in Figure 3 a V-shaped figure indicates a peaked filter, while a U-shaped figure indicates a band-pass filter.

This fixed frequency of 760 kilocycles is obtained as shown in the bottom row of the diagram by a series of filters and harmonic generators, indicated by reference character 212, which multiply the 38 kilocycle amplifier output by 20.

Connected to each of the eleven amplifier output filters 231—241 are the grids of three tubes in parallel. The reason for three tubes is due to the desirability of having these frequencies available for three separate and distinct frequency measuring receivers A, B and C. Only two sets of these tubes are shown on the diagram to avoid confusion.

The tubes which are used with frequency measuring receiver A may be identified by character A1 to A11. It will be seen that the plates of this series of tubes are all connected in parallel.

In a similar manner the plates of tubes B1 to B11 for use with receiver B are connected in parallel, as are also the plates of tubes C1 to C11 for receiver C.

It may be seen from the figure that the screens of the tubes A1 to A11 are connected to a series of terminals. These terminals are cabled to a single pole eleven position switch 213 at measuring receiver A. The screens of tubes B1 to B11 and C1 to C11 are cabled to similar switches located on receivers B and C, respectively.

The rotary arm of each of these switches is connected to the screen supply voltage B+. Thus when the arm of this switch connects to terminal 1 screen voltage is applied to tube A1 and when the arm is on terminal 11 screen voltage is applied to tube A11. Hence, only one of the tubes A1 to A11 is in an operating condition at any one time.

The common plate connections of tubes A1 to A11 are connected through a 30-50 kilocycle band-pass filter 216 to converter tube D where the frequency passed by the tube which is in operating condition combines with the fixed 760 kilocycle frequency from 212 to produce a frequency in the range 790–810 kilocycles. This is filtered by a 790–810 kilocycle band-pass filter 218 and is connected in measuring receiver A in place of the 800 kilocycle oscillator shown in Figure 2 to grid 83 of tube 80.

In a similar fashion, the frequency passed by the tube in series B1 to B11 which is in operating condition is filtered, combined with the fixed 760 kilocycles in converter tube E, is again filtered and replaces the 800 kilocycle oscillator in the interpolation oscillator for measuring receiver B. This is repeated a third time for tubes C1 to C11 and receiver C.

Since these frequencies are obtained from the 1000 cycle frequency standard, any possibility of drift of the 800 kilocycle oscillator is eliminated. Oscilloscope 49 may also be eliminated since its only purpose was the accurate setting of the frequency of the 800 kilocycle oscillator and this is now varied by selecting the desired frequency from the device just described.

In Figure 4 we have shown a modification of the system of the present invention whereby frequencies below 100 kilocycles may readily be measured.

In this figure there will be seen at the left several lines 300 coming from radio frequency amplifiers of various low frequency receivers (not shown). These receivers generally operate over the range from 16 kilocycles to 80 kilocycles. The signals on any one of the lines 300 may be selectively connected to the input of a frequency converter 301 by means of switch 302 where it is combined with 100 kilocycles from the frequency standard. If we call the original frequency applied to the input, $f_1$, the new frequency will be 100 kilocycles+$f_1$. The output of the frequency converter 301 passes through a high-pass filter 303 with a cut-off frequency of 100 kilocycles or slightly higher to eliminate undesired frequencies in the output. The output is then connected to the input of radio frequency amplifier 4 of Figure 1 and the new frequency measured. The actual frequency is then obtained by subtracting 100 kilocycles from the result.

While we have particularly shown and described several modifications of our invention, it is to be distinctly understood that our invention is not limited thereto but that improvements within the scope of the invention may be made.

We claim:

1. In a frequency measuring system, a superheterodyne receiver having a tunable oscillator therein, a standard frequency source, means for receiving a signal wave to be measured, means for tuning said receiver to the 10 kilocycle harmonic of said standard frequency source which is nearest said signal wave, means for heterodyning said signal wave with the wave generated by said tunable oscillator to obtain a difference frequency, means for heterodyning the resultant difference frequency with the beat frequency generated by the mixing of the output waves of a pair of independently controllable oscillators to obtain a first intermediate frequency wave, means for generating a fixed frequency wave of the same order of magnitude as said beat frequency, means for mixing said fixed frequency wave with said difference frequency to obtain a second intermediate frequency, means for converting both of said intermediate frequencies to a lower frequency band including the audible frequency range, means for comparing said converted intermediate frequencies whereby said independently controllable oscillators may be so adjusted that said converted intermediate frequencies are equal to one another and means for measuring the difference between said beat frequency and said fixed frequency.

2. In a frequency measuring system, a superheterodyne receiver having a tunable oscillator therein, a standard frequency source, means for receiving a signal wave to be measured, means for tuning said receiver to the 10 kilocycle harmonic of said standard frequency source which is nearest said signal wave, means for heterodyning said signal wave with the wave generated by said tunable oscillator to obtain a difference frequency, means for heterodyning the resultant difference frequency with the output of a variable frequency oscillator to obtain a first intermediate frequency wave, means for generating a fixed frequency wave of the same order of magnitude as said beat frequency, means for mixing said fixed frequency wave with said difference frequency to obtain a second intermediate frequency, means for converting both of said intermediate frequencies to a lower frequency band including the audible frequency range, means for comparing said converted intermediate frequencies, variable frequency means for measuring the difference between said beat frequency and said fixed frequency, means for varying the frequency of said variable frequency oscillator to obtain identity between said converted intermediate frequencies and means for measuring the magnitude of said variation.

3. In a frequency measuring system, means for receiving a signal wave to be measured including a superheterodyne receiver having a tunable oscillator therein, said receiver being tunable to the harmonic of a standard frequency source which is nearest in frequency to that of said signal wave, means for heterodyning said signal wave with the wave generated by said oscillator to obtain a difference frequency, an interpolation oscillator comprising a pair of independently variable wave generators and means for mixing the waves generated thereby to obtain a beat frequency, means for comparing said beat frequency with said difference frequency, one of said generators being variable over at least the greater part of the maximum possible comparison range and the other over only a definite fraction of the range of said one oscillator.

4. In a frequency measuring system, means for receiving a signal wave to be measured including a superheterodyne receiver having a tunable oscillator therein, said receiver being tunable to the 10 kilocycle harmonic of a standard frequency source which is nearest in frequency to that of said signal wave, means for heterodyning said signal wave with the wave generated by said oscillator to obtain a difference frequency, an interpolation oscillator comprising a pair of independently variable wave generators and means for mixing the waves generated thereby to obtain a beat frequency, means for comparing said beat frequency with said difference frequency, one of said generators being variable over at least the greater part of the maximum possible comparison range and the other over only a definite fraction of the range of said one oscillator, the sum of the variations of said generators being greater than the intervals between the harmonics from said standard frequency source.

5. A frequency measuring system consisting of preselector circuits, a first converter, a first branch and a second branch, each branch being coupled to said first converter to receive a first intermediate frequency output therefrom, means in the first branch to indicate when the first intermediate frequency is exactly equal to a certain locally generated constant frequency, means in the second branch including a calibrated variable frequency source for heterodyning the first intermediate frequency to produce a second intermediate frequency, means for indicating when the second intermediate frequency is exactly equal to another locally generated constant frequency, means for generating known harmonic frequencies of a local standard frequency, means for introducing these known harmonic frequencies into the preselector circuits, means for introducing the unknown frequency into the preselector circuits, tuning means in the preselector circuits and first converter whereby the known harmonic frequency and unknown frequency may both be tuned in and converted to frequencies to which the first and second branches are responsive, so that the unknown frequency can be accurately determined by measuring with the calibrated variable frequency source the difference between the known harmonic frequency and the unknown frequency, the correct condition of adjustment of the first converter being indicated by the response to the known harmonic frequency in the first branch during the time required to manipulate the calibrated variable frequency source in the second branch.

6. In a frequency measuring system, means for receiving a signal wave to be measured including a superheterodyne receiver having a tunable oscillator therein, said receiver being tunable to the 10 kilocycle harmonic of a standard frequency source which is nearest in frequency to that of said signal wave, means for heterodyning said signal wave with the wave generated by said oscillator to obtain a difference frequency, an interpolation oscillator comprising a pair of independently variable wave generators and means for mixing the waves generated thereby to obtain a beat frequency, means for comparing said beat frequency with said difference frequency, one of said generators being variable in a plurality of definitely known steps over a 20 kilocycle band and the other continuously variable over a 2 kilocycle band.

7. In a frequency measuring system, means for receiving a signal wave to be measured including a superheterodyne receiver having a tunable oscillator therein, said receiver being tunable to the harmonic of a standard frequency source which is nearest in frequency to that of said signal wave, means for heterodyning said signal wave with the wave generated by said oscillator to obtain a difference frequency, an interpolation oscillator comprising a pair of independently variable wave generators and means for mixing the waves generated thereby to obtain a beat frequency, means for comparing said beat frequency with said difference frequency, one of said generators being variable over at least the greater part of the maximum possible comparison range and the other over only a definite fraction of the range of said one oscillator, and means for comparing the output of said interpolation oscillator with a standard frequency source whereby the frequency of said interpolation oscillator in terms of multiples of said second standard frequency may be determined.

8. In a frequency measuring system, means for receiving a signal wave to be measured including a superheterodyne receiver having a tunable oscillator therein, said receiver being tunable to the 10 kilocycle harmonic of a standard frequency source which is nearest in frequency to that of said signal wave, means for heterodyning said signal wave with the wave generated by said oscillator to obtain a difference frequency, an interpolation oscillator comprising a pair of independently variable wave generators and means for mixing the waves generated thereby to obtain a beat frequency, means for comparing said beat frequency with said difference frequency, one of said generators being variable over at least the greater part of the maximum possible comparison range and the other over only a definite fraction of the range of said one oscillator, and an oscilloscope for comparing the output of said interpolation oscillator with a standard frequency source whereby the frequency of said interpolation oscillator in terms of multiples of said second standard frequency may be determined.

9. In a frequency measuring system, means for receiving a signal wave to be measured including a superheterodyne receiver having a tunable oscillator therein, said receiver being tunable to the harmonic of a standard frequency source which is nearest in frequency to that of said signal wave, means for heterodyning said signal wave with the wave generated by said oscillator to obtain a difference frequency, an oscillator for generating another wave, means for mixing said other wave with said difference frequency to produce a first intermediate frequency and means for mixing said first intermediate frequency with the wave energy of such frequency that for a predetermined difference frequency a zero beat is obtained.

10. In a frequency measuring system, means for receiving a signal wave to be measured including a superheterodyne receiver having a tunable oscillator therein, said receiver being tunable to the harmonic of a standard frequency source which is nearest in frequency to that of said signal wave, means for heterodyning said signal wave with the wave generated by said oscillator to obtain a difference frequency, an interpolation oscillator comprising a pair of independently variable wave generators and means for mixing the wave generated thereby to obtain a beat frequency and means for comparing said beat frequency with said difference frequency, said last means including means for converting the wave generated by the mixing of said beat frequency and difference frequency to a predetermined frequency for a known relationship between said beat frequency and difference frequency.

HAROLD O. PETERSON.
JOHN B. ATWOOD.